Sept. 24, 1963   R. MINETTI   3,104,646
TIME-SETTING DEVICE
Filed March 19, 1962

INVENTOR.
RALF MINETTI
BY
James E. Bryan
ATTORNEY

United States Patent Office 3,104,646
Patented Sept. 24, 1963

3,104,646
TIME-SETTING DEVICE
Ralf Minetti, Jaegerstrasse 12, Kassel, Germany
Filed Mar. 19, 1962, Ser. No. 181,233
Claims priority, application Germany Mar. 23, 1961
7 Claims. (Cl. 116—133)

This invention relates to a time-setting device used, for example, in motor vehicles in order to indicate the approximate parking time, or in the home or office to indicate the time of return of a person temporarily absent.

The time setting device of the present invention is inexpensive to manufacture and, thus, is adapted for use as a premium to be given away by manufacturing firms for advertising purposes.

The novel time-setting device of the invention is adapted to be permanently secured to a smooth surface, such as the windshield of a motor vehicle, for example, and it includes an indicator or pointer which is rotatably mounted for adjustment by hand and without effort through a full 360° angle without the necessity of detaching the indicator from its supporting base. The time-setting device has the further desirable feature in that it may be read from both the front and back, i.e., it may be read from both sides of a window when supported thereby.

The device of the present invention includes a means for mounting it on a surface, such as a suction cup, for example, and has a manually adjustable indicator connected with a hub portion of the suction cup and coacting with a scale on the rim of the suction cup. The scale may be provided around the circumference or rim of the suction cup and, in this case, the device consists of merely 2 parts. It is also contemplated to provide the scale on a circular disc having an aperture in the center thereof which is slid over the hub portion of the suction cup. If the disc consists of a transparent material, one scale will be sufficient to render the indicated time visible on both sides of the disc. If, on the other hand, the disc consists of an opaque material, the disc is preferably provided on both sides thereof wtih a scale similar to that used on a clock, the scales being oppositely disposed with respect to each other. In this case, the indicator or pointer will show the same value on each side since the indicator covers the scale on one side of the disc and, on the other side, the time is indicated by that portion of the indicator or pointer protruding beyond the edge of the disc. This arrangement of the indicator protruding beyond the rim or edge of the disc also results in the desirable feature that the indicator may be turned with one finger without effort.

Figure 1:
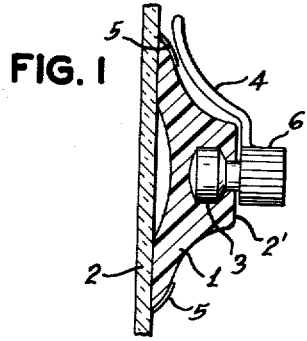
Figure 2:
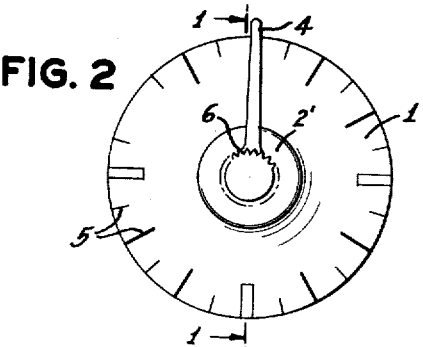
Figure 3:
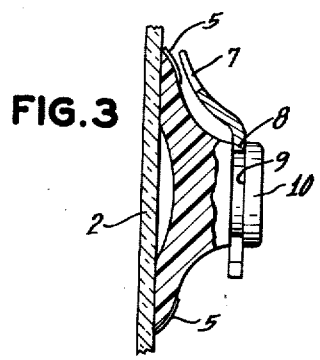
Figure 4:
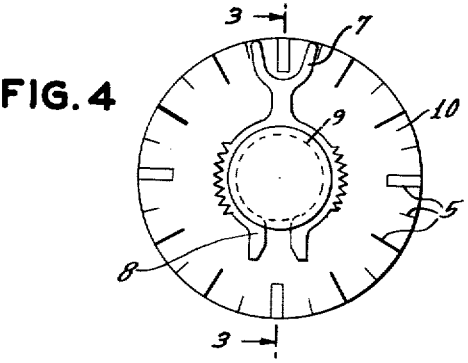
Figure 5:
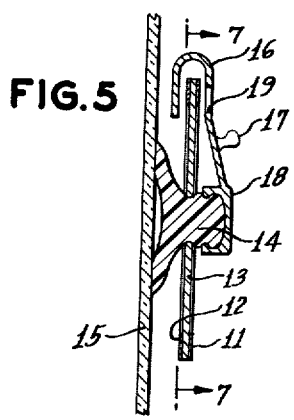
Figure 6:
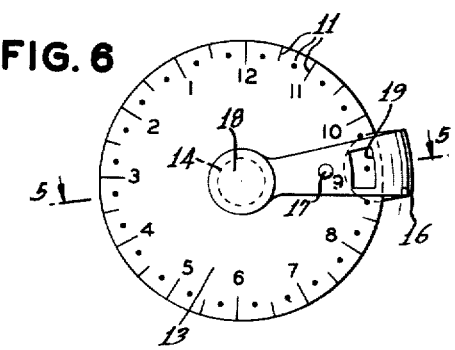
Figure 7:
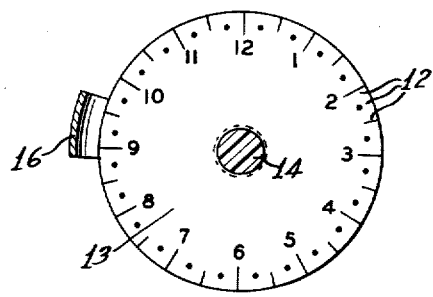

Several embodiments of the present invention are shown in the accompanying drawings in which FIGURE 1 is a view in cross-section, taken on line 1—1 of FIGURE 2, of the device including a suction cup, indicator and scale, FIGURE 2 is a plan view of the device of FIGURE 1, FIGURE 3 is a cross-section, taken on line 3—3 of FIGURE 4, through an indicator having a widened or enlarged tip and being secured to a suction cup, FIGURE 4 is a plan view of the device shown in FIGURE 3, FIGURE 5 is a cross-section, taken on line 5—5 of FIGURE 6, through a device including a suction cup, indicator and scales on a scale disc, FIGURE 6 is a plan view of the device shown in FIGURE 5, and FIGURE 7 is a plan view of the opposite side of the scale disc shown in FIGURE 6 and taken on line 7—7 of FIGURE 5.

Referring to FIGURES 1 and 2 of the drawings, the device includes a suction cup 1, made of any suitable transparent material, such as transparent plastic, for example. The suction cup may be mounted on the inside of a windshield 2 of a motor vehicle, for example. In the hub portion 2' thereof, the suction cup is provided with a recess 3 in which a pointer 4 is rotatably mounted. There is sufficient friction between the indicator 4 and the suction cup 1 so that the pointer remains in any desired position although it may be easily turned by hand. The indicator 4 coacts with a scale 5 which is provided around the rim of the suction cup. The indicator may be turned through a full 360° angle by turning the grooved portion 6 manually. If a certain time is set on the scale with the aid of the indicator, it may also be read from the outside of the windshield since the suction cup is transparent.

Fastening of the indicator on the hub portion of the suction cup may also be effected, instead of by means of a knob, with a ring disposed on the indicator with which it encloses the hub of the suction cup. In this arrangement, it is also possible to secure two indicators on one suction cup, with which the period of time may then be set.

It is also possible to provide the indicator with an enlarged or widened tip so that it indicates on the scale a certain length of time, for example, one hour. Such an indicator arrangement 7 is shown in FIGURES 3 and 4. In these figures, the indicator is provided with a snap ring 8 on one end thereof with which it engages a groove 9 in the hub portion of the suction cup 10, as shown in FIGURE 4.

In the embodiments shown in FIGURES 5 and 6, two scales 11 and 12 are provided on a circular disc 13, the disc being provided with an aperture in the center thereof which is slid over the hub of the suction cup 14. The entire assembly may then be secured to the inside of a windshield 15. An indicator 16, provided wtih a setting knob 17, serves to indicate the time and is provided on one side thereof with a cap 18 pressed on the hub of the suction cup 14 so that the indicator may be rotated a full 360° around the supporting base 14.

The scale 12 is subdivided in the manner of a normal clock scale whereas the scale 11 on the rear of the disc 13 on the inside of the vehicle is oppositely disposed to the normal scale on a clock, as shown in FIGURE 6.

As a result of this arrangement, the indicator 16 will point to the same period of time on both sides of the scale disc so that the disc and suction cup need not be detached when the time is to be set.

Turning of the indicator 16 need not necessarily be effected by means of the knob 17, but may also be effected by placing one finger on that point of the indicator which projects beyond the edge of the disc. Setting of the desired time is facilitated also by a window 19 in the indicator 18, as shown in FIGURE 6.

In this embodiment, the indicator may be provided also with a ring instead of a cap 18, the ring enclosing the hub of the suction cup, as in the embodiment of FIGURES 3 and 4. It may also be secured to the suction cup on the other side of the scale disc, e.i., on that side of the scale disc adjacent the windshield.

Setting of the time may be also made by rotating the scale disc 13 on the suction cup 14. It is more desirable, however, to mount the disc on the suction cup in a stationary manner so that the "12" of the scale is always maintained at the highest point of the circle, as is the case in a clock or watch. It may, therefore, be desirable to form the aperture in the disc 13 in a non-circular manner, i.e., rectangular, and shape the hub section of the suction cup 14 in a similar manner whereby the disc is prevented from rotating relative to the suction cup or base 14.

It will be obvious to those skilled in the art that many modifications may be made within the scope of the present invention without departing from the spirit thereof, and the invention includes all such modifications.

What is claimed is:

1. A time-setting device comprising a dial means, said dial means having front and rear sides, means for securing said dial means to a smooth surface, and means including a hub portion, an indicator rotatably mounted on said hub portion, scale means on said dial means and means whereby the position of said indicator relative to the scale means is readable from either side of the dial.

2. A time-setting device according to claim 1 in which the means for securing the dial means to a smooth surface is a suction cup.

3. A time-setting device comprising a dial means, said dial means having front and rear sides, suction means for securing said dial means to a smooth surface, said suction means including a hub portion, an indicator rotatably mounted on said hub portion, scale means on both sides of said dial means and means whereby the position of said indicator relative to both scale means is readable from either side of the dial.

4. A time-setting device comprising a dial means, said dial means having front and rear sides, suction means for securing said dial means to a smooth surface, said suction means including a hub portion, an indicator rotatably mounted on said hub portion and extending beyond the rim of the dial means, and scale means on both sides of the dial means whereby the position of said indicator relative to both scale means is readable from either side of the dial.

5. A time-setting device comprising a transparent suction cup having front and rear sides and a scale means disposed around the rim thereof, and an indicator rotatably mounted on the suction cup whereby the position of said indicator relative to the scale means is readable from either side of the suction cup.

6. A time-setting device comprising a suction cup having a hub portion and a dial means mounted thereon, said dial means having scale means on both sides thereof, and an indicator rotatably mounted on the hub portion and extending beyond the rim of said dial means, whereby the position of said indicator relative to both scale means is readable from either side of the dial.

7. A time-setting device comprising a suction cup having a transparent dial means mounted thereon, said dial means having scale means on at least one side thereof, and an indicator rotatably mounted on the suction cup, whereby the position of said indicator relative to the scale means is readable from either side of the transparent dial means.

References Cited in the file of this patent

UNITED STATES PATENTS

| | | |
|---|---|---|
| 1,546,042 | Story | July 14, 1925 |
| 1,606,853 | Trisler | Nov. 16, 1926 |
| 1,853,580 | Sandow | Apr. 12, 1932 |
| 2,349,853 | Ebert | May 30, 1944 |
| 2,578,134 | Headrick | Dec. 11, 1951 |
| 2,681,633 | Basso | June 22, 1954 |
| 2,788,765 | Haynes | Apr. 16, 1957 |
| 2,870,735 | Hunt | Jan. 27, 1959 |

UNITED STATES PATENT OFFICE
CERTIFICATE OF CORRECTION

Patent No. 3,104,646                              September 24, 1963

Ralf Minetti

It is hereby certified that error appears in the above numbered patent requiring correction and that the said Letters Patent should read as corrected below.

Column 2, line 57, for "e.i." read -- i.e. --; column 3, line 6, for "and" read -- said --.

Signed and sealed this 7th day of April 1964.

(SEAL)
Attest:
ERNEST W. SWIDER

Attesting Officer

EDWARD J. BRENNER

Commissioner of Patents